(12) United States Patent
Sato

(10) Patent No.: US 7,157,907 B2
(45) Date of Patent: Jan. 2, 2007

(54) NON-CONTACT ROTATION ANGLE DETECTING SENSOR

(76) Inventor: Shunichi Sato, c/o Niles Co., Ltd., No. 5-28-6, Omorinishi, Ota-ku, Tokyo (JP) 143-8521

( * ) Notice: Subject to any disclaimer, the term of this patent is extended or adjusted under 35 U.S.C. 154(b) by 0 days.

(21) Appl. No.: 11/261,547

(22) Filed: Oct. 31, 2005

(65) Prior Publication Data

US 2006/0158180 A1 Jul. 20, 2006

(30) Foreign Application Priority Data

Nov. 1, 2004 (JP) ............................. 2004-318131

(51) Int. Cl.
*G01B 7/30* (2006.01)
(52) U.S. Cl. ................................ 324/207.25
(58) Field of Classification Search ............ 324/207.25
See application file for complete search history.

(56) References Cited

U.S. PATENT DOCUMENTS 6,593,734 B1 * 7/2003 Gandel et al. ......... 324/207.25

2004/0217757 A1 * 11/2004 Tromblee ................ 324/207.2

* cited by examiner

*Primary Examiner*—Bot LeDynh
(74) *Attorney, Agent, or Firm*—Rader Fishman & Grauer PLLC; Ronald P. Kananen

(57) ABSTRACT

A stationary yoke surrounds an outer peripheral surface of a ring-shaped permanent magnet in a certain distance. The ring-shaped permanent magnet is fixed to a rotor and has two poles of N, S poles in a diameter direction. The stationary yoke includes a first outside yoke and a second outside yoke overlapped in an axial direction and a hole element is disposed in a gap of the first outside yoke. An axial height of the first outside yoke changes along the circumferential direction and a height of the second outside yoke has a complementary relation with the height of the first outside yoke, and the first outside yoke and the second outside yoke are overlapped in a certain clearance. A ratio of an amount of the magnetic flux passing through the gap to an amount of the magnetic flux not passing through the gap changes with rotation of the ring-shaped permanent magnet and further, the change of the height causes a change in the magnetic flux amount flowing in the first outside yoke, thereby improving linearity of an output of a hole element.

7 Claims, 7 Drawing Sheets

NON-CONTACT ROTATION ANGLE DETECTING SENSOR

BACKGROUND OF THE INVENTION

1. Field of the Invention

The present invention relates to a non-contact rotation angle detecting sensor using a magnetic responsive element.

2. The Related Art of the Invention

As a rotation angle sensor, for example, suitable for detecting a depressing angle of an accelerator pedal or detecting a rotation angle of a shaft rotating in accordance with an operation of shift lever for a vehicle, which is portable and has no possibility of contact defect due to a foreign matter, there is a non-contact rotation angle sensor using a magnetic responsive element.

Japanese Unexamined Publication No. 5-505883 has disclosed, for example, a conventional example of such a non-contact rotation angle sensor.

In this conventional example, as shown in FIG. 7A, a ring-shape permanent magnet 100 which is divided in a semi circle is fixed to a rotor (not shown) to form two poles, N and S in a diameter direction, and on the other hand, an outer periphery of the permanent magnet is surrounded by an outside yoke 110 in a predetermined distance therefrom and a hole element 105 is disposed in a gap provided in the outside yoke 110. The outside yoke 110 has a rectangular cross section, the width and the axial height of which are respectively constant in the circumferential direction.

In the above arrangement, magnetic flux generated from the ring-shaped permanent magnet 100 passes through the outside yoke 110. When the ring-shaped permanent magnet rotates with the rotor, since the axial height of the outside yoke 110 facing the magnet is constant, a sum of the magnetic flux passing through the outside yoke 110 is constant, but a ratio of an amount of the magnetic flux passing through the hole element 105 disposed in the gap of the outside yoke 110 to an amount of the magnetic flux not passing through the hole element 105 changes with rotation of ring-shaped permanent magnet 100.

Thereby, a rotation angle of the rotor (ring-shaped permanent magnet 100) can be theoretically determined from change in output of the hole element 105.

A to E in FIG. 7A, show an amount of the magnetic flux passing through the hole element 105 with rotation of the ring-shaped permanent magnet 100. FIG. 7B shows an output of the hole element 105 to a rotation angle and A to E on the line correspond to each rotation angle position of the ring-shaped permanent magnet 100 in FIG. 7A.

In the conventional non-contact rotation angle detecting sensor, however, as shown in FIG. 7B, an output change of the hole element 105 is clear in a predetermined range B to D including a rotation angle 0° where the direction of the magnetic flux passing through the hole element 105 changes, but there occurs the problem with linearity of an output signal as deviated out of the predetermined range.

It is assumed that this is because an amount of the magnetic flux passing through the hole element 105 increases as deviated out of the predetermined range, while a change rate of the magnetic flux becomes relatively small.

When the linearity of the output signal of the hole element is not maintained in this way, there is the problem that a desired accuracy can not be provided in a case a rotation angle is required to be detected over a relatively wide angle range.

Coping with this, it is considered that the ring shape of the outside yoke is formed in an elliptic shape or a clearance between the outside yoke and the permanent magnet is changed. However, these are theoretical measures, and in fact, it is technically difficult to apply these measures to a case of mass production such as a vehicle in consideration of variations in the manufacture or technical variations in products.

In addition, as a ring-shaped permanent magnet, there are many examples using an anisotropic magnet. However, there is the problem that the anisotropic magnet is expensive and is in lack of workability.

In view of the above, there exists a need for anon-contact rotation angle detecting sensor which overcomes the above-mentioned problems in the related art. The present invention addresses this need in the related art and also other needs, which will become apparent to those skilled in the art from this disclosure.

SUMMARY OF THE INVENTION

The present invention, from a viewpoint of the foregoing problems, has an object of providing a non-contact rotation angle detecting sensor, which has a simple structure and is accurate.

Therefore, a non-contact rotation angle detecting sensor according to the preset invention comprises a ring-shaped permanent magnet which is rotated integrally with a rotor and a magnetic pole of which changes along a circumferential direction, a ring-shaped stationary yoke including a first yoke and a second yoke overlapped in an axial direction and surrounding an outer peripheral surface of the ring-shaped permanent magnet in a predetermined distances, and a magnetic responsive element disposed in a gap formed on a ring of the first yoke, wherein an axial height of the first yoke changes along a circumferential direction.

Advantages of the Invention

Since a ratio of an amount of magnetic flux passing through the gap portion to an amount of the magnetic flux not passing through the gap portion changes with rotation of the ring-shaped permanent magnet, as well as the amount of the magnetic flux passing through the first yoke changes with a change in height of the first yoke, the magnetic responsive element outputs a signal based upon the two changes, thus providing a high linearity of a signal output to the rotation angle.

BRIEF DESCRIPTION OF THE DRAWINGS

The preferred embodiment according to the invention will be explained below referring to the drawings, wherein.

DETAILED DESCRIPTION OF THE PREFERRED EMBODIMENTS

A preferred embodiment of the present invention will be hereinafter explained in detail with reference to the drawings.

Figure 1A:
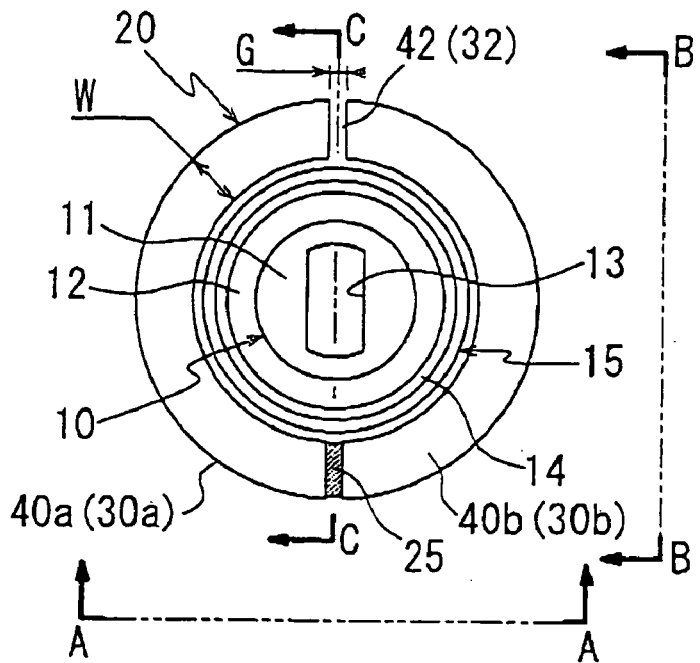
FIG. 1A is a plan view seen from an axial direction, showing an outside appearance in a preferred embodiment of the present invention.
Figure 1B:
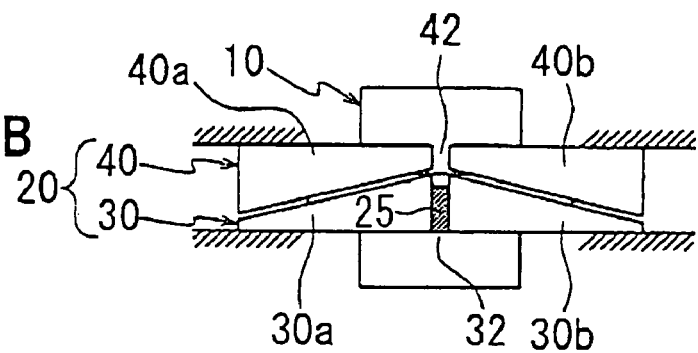
FIG. 1B is a cross-sectional view in the direction of arrows along lines A—A in FIG. 1A.
Figure 1C:
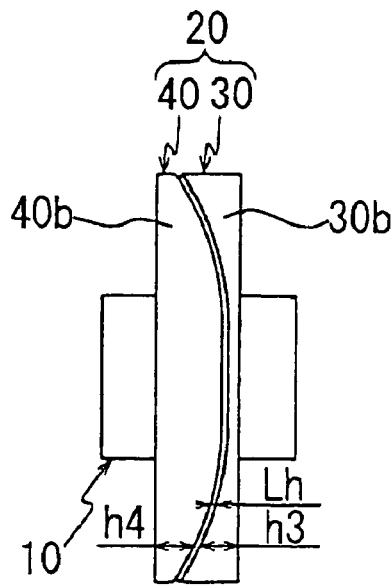
FIG. 1C is a cross-sectional view in the direction of arrows along lines B—B in FIG. 1A.
Figure 2:
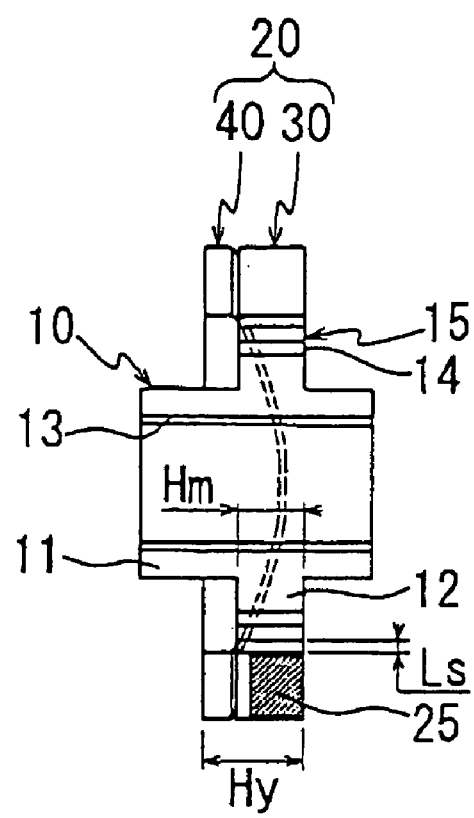
FIG. 2 is a cross-sectional view taken on lines C—C in FIG. 1A.
Figure 3:
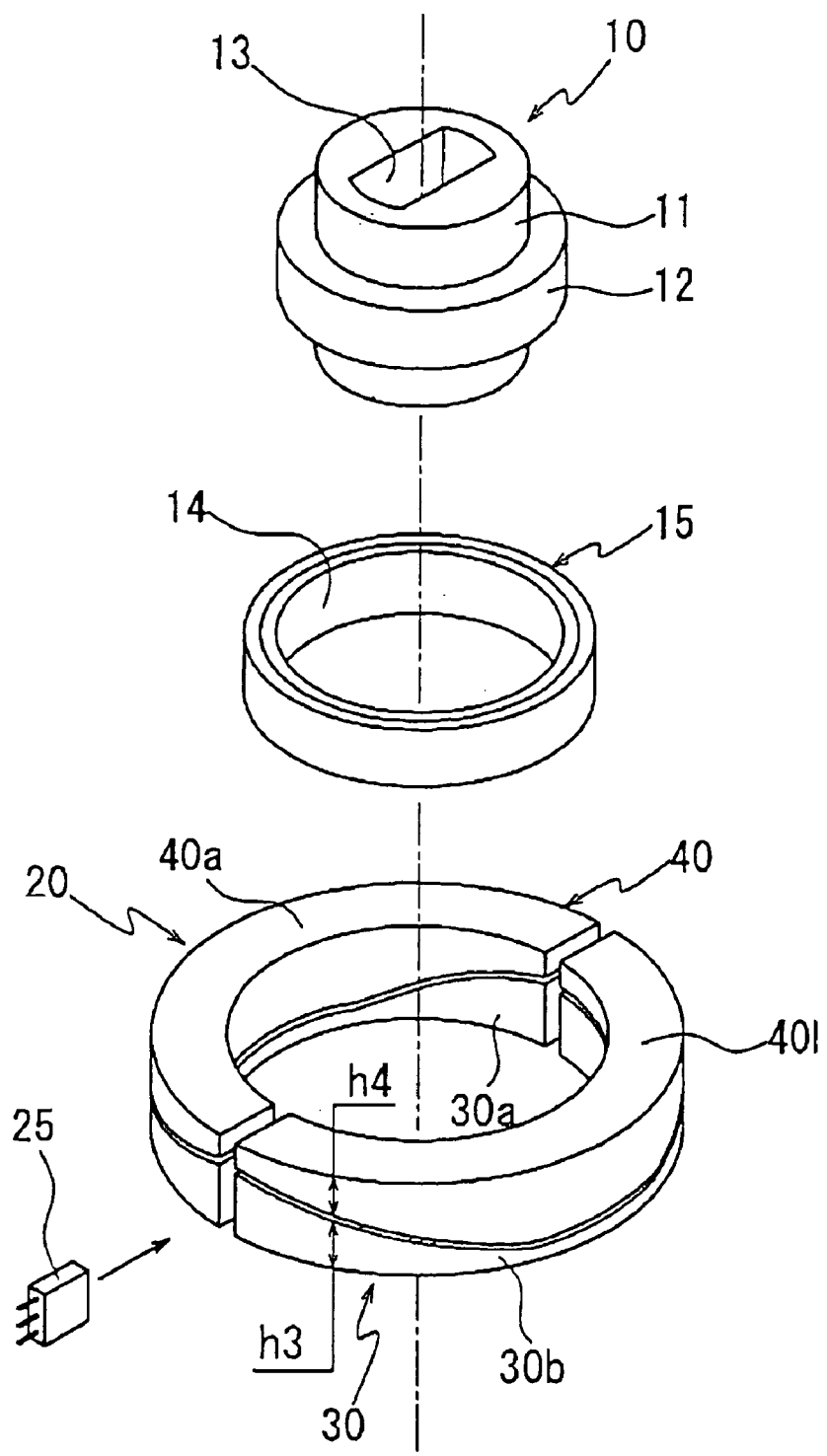
FIG. 3 is a perspective view exploded partly from the entire constitution.

FIG. 1A is a plan view seen from an axial direction, showing an outside appearance in a preferred embodiment of the present invention, FIG. 1B is a cross-sectional view in the direction of arrows along lines A—A in FIG. 1A, FIG. 1C is a cross-sectional view in the direction of arrows along lines B—B in FIG. 1A, FIG. 2 is a cross-sectional view taken on lines C—C in FIG. 1A, and FIG. 3 is a perspective view exploded partly from the entire constitution.

A rotor 10 attached to a shaft (not shown) as a rotating body of a detection object is formed of a main body 11 with a column-shaped outside appearance and a flange-shaped magnetic retainer 12 extending in a diameter direction from the intermediate position in an axial direction of the main body 11. The main body 11 is provided with a penetrating hole 13 through which the shaft passes and the cross section of the penetrating hole 13 has a bolt width portion aligned with a mounting cross section of the shaft, so that the rotor 10 can rotate integrally with the shaft in a state the mounting portion of the shaft is inserted.

Figure 4:
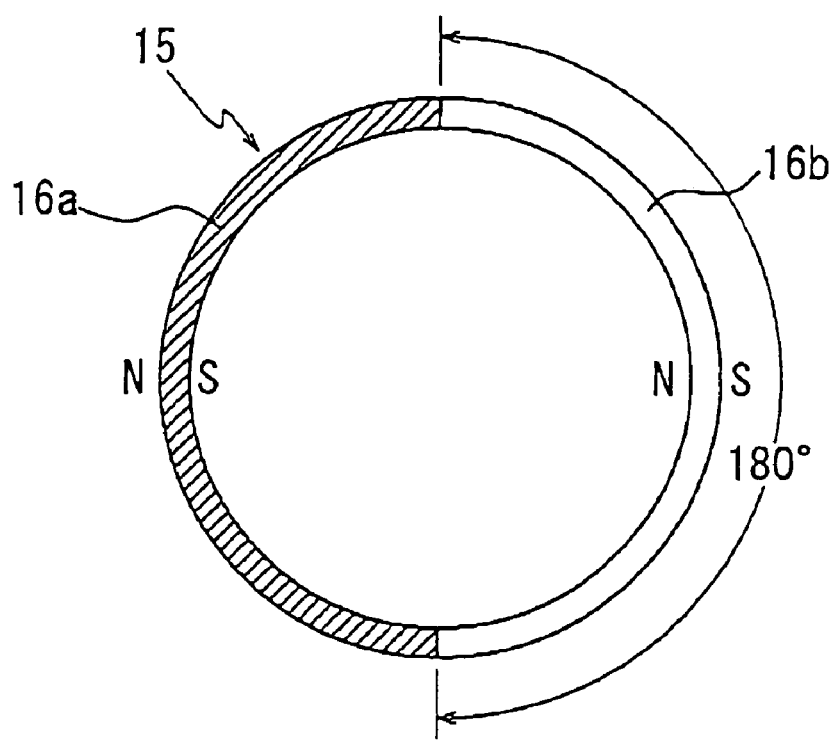
FIG. 4 is an enlarged plan view showing a ring-shaped permanent magnet in the preferred embodiment of the present invention.

A ring-shaped permanent magnet 15 is mounted through a ring-shaped support yoke 14 made of steel to the magnetic retainer 12. The ring-shaped permanent magnet 15, as enlarged in FIG. 4, is divided half on a diameter line with a constant width. One of a magnetic semi circle portion 16a defines an inner peripheral side as S pole and an outer peripheral side as N pole and the other of a magnetic semi circle portion 16b defines an inner peripheral side as N pole and an outer peripheral side as S pole and as a whole, it forms a two-pole structure with N and S in the circumferential direction. A material of the ring-shaped permanent magnet 15 is not limited to an anisotropic magnet, but may be an isotopic magnet as a choice.

The ring-shaped permanent magnet 15 formed of the two of the magnetic semi circle portions 16a and 16b is fixed to an outer peripheral surface of the support yoke 14 and the support yoke 14 is fixed to the an outer peripheral surface of the magnetic retainer 12 of the rotor. In the preferred embodiment, an axial height of each of the ring-shaped permanent magnet 15 and the support yoke 14 is arranged to correspond to an axial height of the magnetic retainer 12.

As described above, a stationary yoke 40 formed of a first outside yoke 30 and a second outside yoke 40 is disposed in a stationary side to the shaft, surrounding the ring-shaped permanent magnet 15 mounted to the rotor 10. Materials of the first outside yoke 30 and the second outside yoke 40 are steel.

The first outside yoke 30 and the second outside yoke 40 have flat shapes in an axial direction which are identical with each other and are divided in a semi circle on each diameter line (180° position in the circumferential direction) with a certain width W and opposing faces in the circumferential direction between the yoke semi circle portion 30a (40a) and the yoke semi circle portion 30b (40b) are cut off to form gaps 32 and 42 at two locations each, each having a constant width.

The first outside yoke 30 and the second outside yoke 40 are overlapped with each other in an axial direction by aligning the gap 42 with the gap 32 in the axial direction and an inner peripheral surface of each thereof faces an outer peripheral surface of the ring-shaped permanent magnet with a certain clearance Ls provided therebetween.

A height h3 (axial direction) of the first outside yoke 30 and a height h4 of the second outside yoke 40 change along the circumferential direction and a lower surface of the first outside yoke 30 (an opposite side of the facing surface to the second outside yoke 40) and a upper surface of the second outside yoke 40 (an opposite side of the facing surface to the first outside yoke 30) have flat surfaces perpendicular to each axial direction. Each cross section of the in the circumferential direction of the first outside yoke 30 and the second outside yoke 40 has a rectangular cross section the height of which changes.

The height h3 of the first outside yoke 30 has a complementary relation with the height h4 of the second outside yoke 40. In the circumferential position the height h3 of the first outside yoke 30 is large, the height h4 of the second outside yoke 40 is small, and in the circcumferential position the height h3 of the first outside yoke 30 is small, the height h4 of the second outside yoke 40 is large.

A certain clearance Lh is set in the circumferential direction between an upper surface of the first outside yoke 30 and a lower surface of the second outside yoke 40.

A lower surface of the first outside yoke 30 corresponds to an upper surface of the ring-shaped permanent magnet 15.

A height Hy of the stationary yoke 20 formed by overlaping the first outside yoke 30 and the second outside yoke 40 including the certain clearance Lh and a height Hm of the ring-shaped permanent magnet 15 are set to have a relation of Hy>Hm, and for example, a height Hm of the ring-shaped permanent magnet 15 is equal to the highest of the first outside yoke 30, and the inner peripheral surface of the first outside yoke 30 faces directly the outer peripheral surface of the ring-shaped permanent magnet 15 in all positions of the circumferential direction. Note that the above certain width W of each of the first outside yoke 30 and the second outside yoke 40 is set so that the magnetic flux is not saturated in the yoke in consideration of magnetic permeability in material of each yoke and density of the magnetic flux of the ring-shaped permanent magnet 15.

A hole element 25 is disposed as a magnetic responsive element in one of gaps 32 of the first outside yoke 30.

In the preferred embodiment as constituted above, all of the magnetic flux generated from the ring-shaped permanent magnet 15 pass through the first outside yoke 30 and the second outside yoke 40 and when the ring-shaped permanent magnet 15 rotates with the rotor 10, a ratio of an amount of the magnetic flux passing through the gap 32 in which the hole element 25 is disposed to an amount of the magnetic flux not passing through the gap 32 changes. This is the same as the operations of the conventional example shown in FIG. 7A.

In the preferred embodiment, further, the height h3 of the first outside yoke 30 changes in the circumferential direction and therefore, an amount of the magnetic flux flowing in the first outside yoke 30 changes with rotation of the ring-shaped permanent magnet 15. And since the hole element 25 of the gap 32 is disposed between the opposing faces in the yoke semicircle portions 30a and 30b of the first outside yoke 30, the hole element 25 is subject to a change of the magnetic flux amount and a change of the ratio in the previous magnetic flux.

Accordingly, a value of the height h3 of the first outside yoke 30 changing in the circumferential direction is selected by an experimental measurement, thereby obtaining an output with an improved linearity.

Figures 7A, 7B:
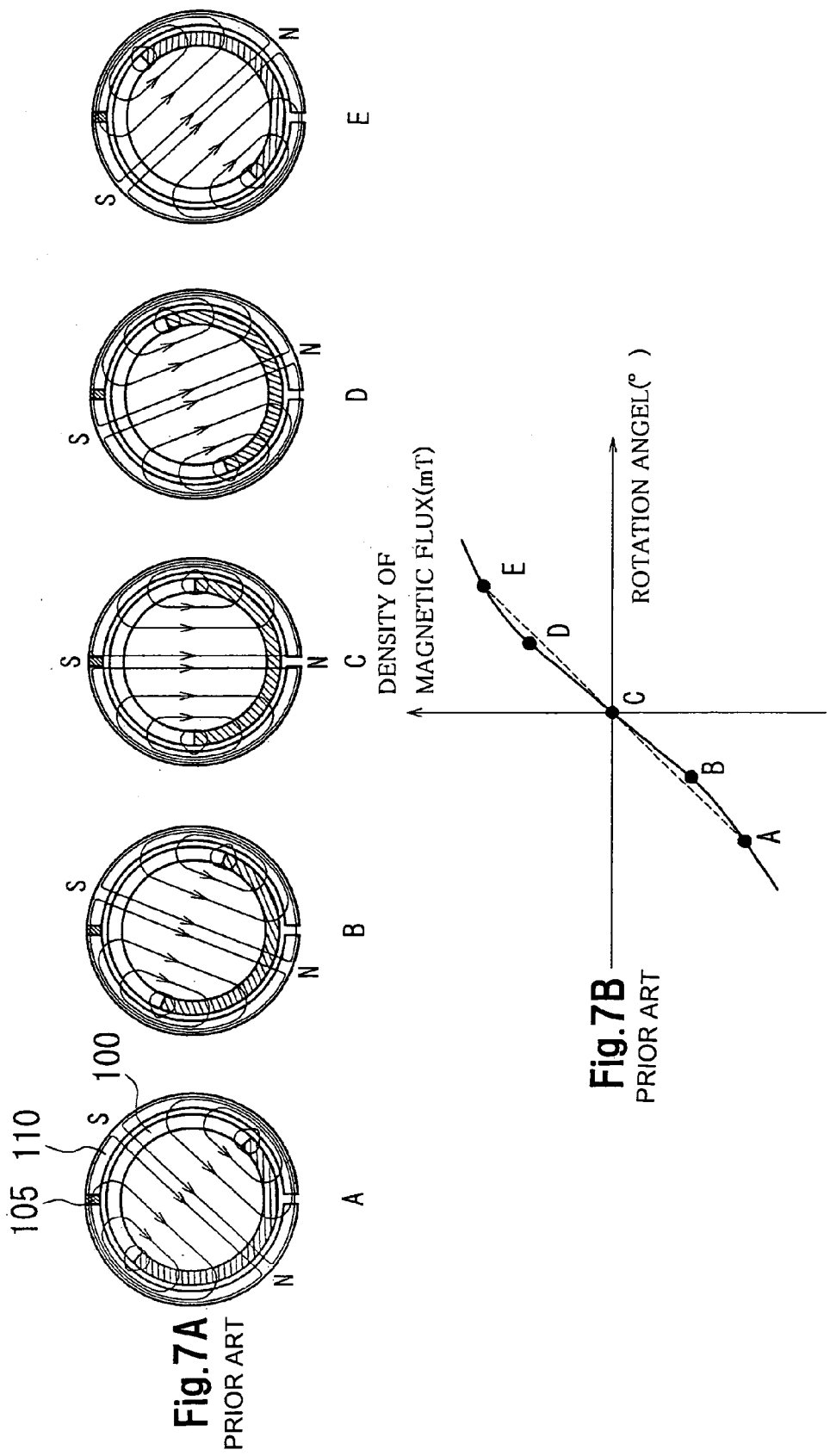
FIG. 7, consisting of FIG. 7A and FIG. 7B, is a view showing a modification of the gap portion in the preferred embodiment of the present invention.

In regard to a detailed method of selecting a height h3, for example, a linear line (dotted line) connecting a point a and a point B which are both ends in the measurement range in FIG. 7B is set as a idealistic linear line and the value of the height h3 is determined by subtracting an amount by which the magnetic flux deviates out of the idealistic linear line.

EXAMPLE

As one example, the ring-shaped permanent magnet 15 uses an isotropic, neodymium bond magnet (molding neodymium, iron, and boron powder with PPS plastic) and has an inner diameter of 21 mm, an outer diameter of 23 mm, a height of 5 mm, a surface magnetic flux density of 75 mT and the support yoke 14 has an inner diameter of 19 mm, an outer diameter of 21 mm, and a height of 5 mm.

In the first outside yoke 30, each of the two semi circle portions 30a and 30b has a width (W) of 4 mm, the maximum portion of the height h3 of 6 mm at both ends of the circular arc, the minimum portion in a concave shape of 1 mm at a center of the circular arc, a width (G) of 1.6 mm of the gap produced by cutting off the both ends by 0.8 mm each and in the second outside yoke 40, each of the two semi circle portions 40a and 40b has a width (W) of 4 mm, the maximum portion of the height h3 of 6 mm at both ends of the circular arc, the minimum portion of 1 mm in a convex shape at a center of the circular arc, and a width (G) of 1.6 mm of the gap produced by cutting off the both ends by 0.8 mm each.

In addition, a clearance (Lh) between the first outside yoke 30 and the second outside yoke 40 is 0.5 mm and a certain clearance (Ls) between the outer peripheral surface (outer diameter 23 mm) of the ring-shaped permanent magnet 15 and the inner peripheral surface of the stationary yoke 20 is 1 mm as the entire circumference.

Figure 5A:
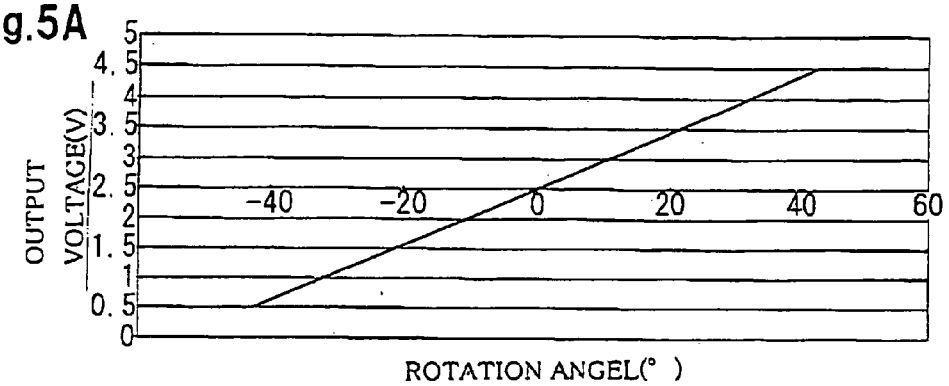
FIG. 5, consisting of FIG. 5A, FIG. 5B, and FIG. 5C, is a view showing operations of the preferred embodiment as compared to that of the conventional example.

FIG. 5A is a detection output graph showing effects of the preferred embodiment by comparing a comparison example which is the conventional example.

Herein, the position of the ring-shaped permanent magnet is a rotation angle of 0° when a line (a linear line perpendicular to a line connecting opposing faces of each end of the magnetic semi circle portions 16a and 16b) connecting N pole and S pole of the ring-shaped permanent magnet having the two-pole structure passes through the gap 32 in which the hole element 25 of the first outside yoke 30 is disposed, and as shown in FIG. 5A, rotation angles of −42.5° to 42.5° are assumed as the detection range, a connecting line between 0.5 V (−42.5°) and 4.5 V (42.5°) of the output voltages of the hole element 25 is assumed as an idealistic linear line.

Figure 5B:
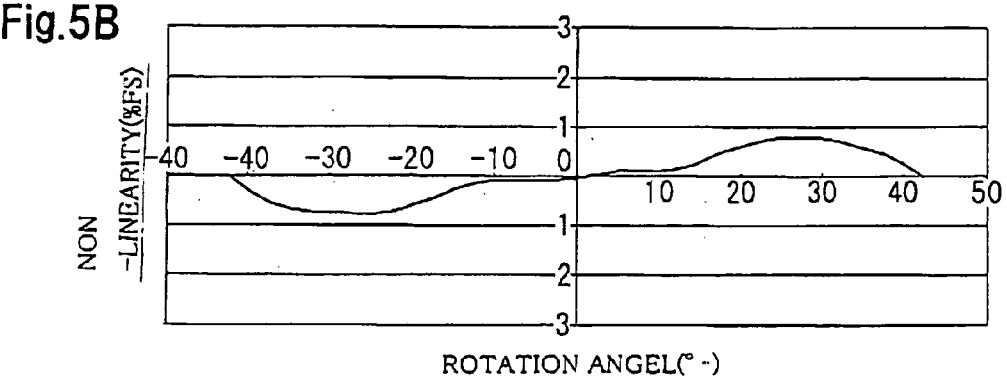
Figure 5C:
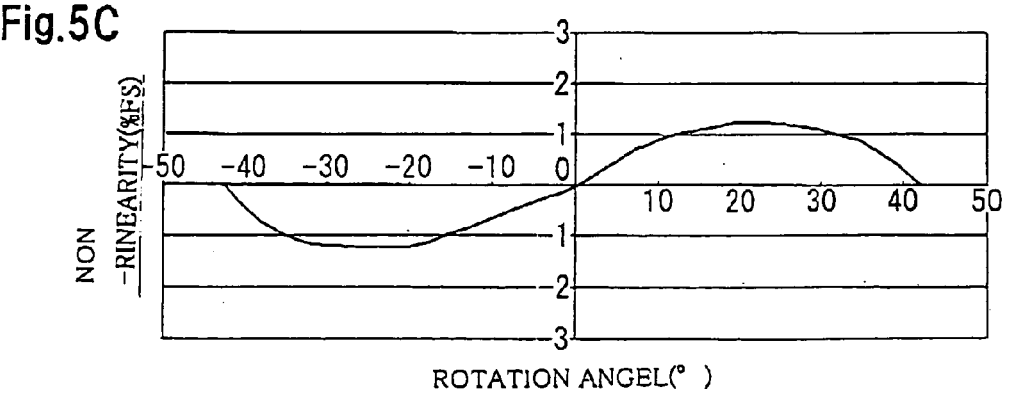

FIG. 5B shows a non-linearity (deviation % FS of an actual output value to an idealistic linear line) of the preferred embodiment, and FIG. 5C shows a non-linearity of the comparison example.

In the comparison example, in the intermediate region of the minus side of the rotation angle and in the intermediate region of the plus side of the rotation angle, the non-linearity reaches 1.2% FS and in the range of each of plus and minus 15° including 0°, it changes into 1.0% FS. On the other hand, it is recognized that in the preferred embodiment, in the entire detection rotation angle range the non-linearity is 1.0% FS or less and in the range of each of plus and minus 15° including 0°, it is 0.5% FS or less, and in the range of being closer to 0° from plus 15° and from minus 15°, a high linearity is obtained, having a percent FS smaller by one digit.

As described above, the preferred embodiment is provided with the ring-shaped permanent magnet 15 rotatable integrally with the rotor 10 mounted to the shaft as a detection object and the magnetic pole of which changes along the circumferential direction, the first outside yoke 30, the second outside yoke 40 overlapped in the axial direction, the ring-shaped stationary yoke 20 surrounding the outer peripheral surface of the ring-shaped permanent magnet 15 with a certain clearance Ls, and the hole element 25 disposed in the gap 32 formed on the ring of the first outside yoke 30, wherein the axial height h3 of the first outside yoke 30 changes along the circumferential direction. Therefore, a ratio of an amount of the magnetic flux passing through the gap 32 to an amount of the magnetic flux not passing through the gap 32 changes in accordance with rotation of the ring-shaped permanent magnet 15, as well as a change of the height of the first outside yoke 30 causes a change of an amount of the magnetic flux flowing in the first outside yoke 30. Since the hole element 25 of the gap 32 is subject to the above two changes, an improvement in linearity which is not obtained conventionally can be realized by selecting a value of the height h3 changing in the circumferential direction of the first outside yoke 30.

In addition, a practical detection angle range is enlarged due to an improvement of this linearity. Since the clearance between the ring-shaped permanent magnet 15 and the stationary yoke 20 is constant, a stable quality is secured without the possible variations in the manufacture unlike a case of forming the ring shape in an elliptic shape or changing the clearance.

In addition, as the ring-shaped permanent magnet, an isotropic magnet which is inexpensive and has excellent workability can be used and therefore, costs as a product can be reduced.

Further, since the moving component is only the ring-shaped permanent magnet 15 mounted to the shaft through the rotor 10, there is no occurrence of mechanical variations in the products.

In particular, when the ring-shaped permanent magnet 15 is arranged to have two poles of N pole and S pole in the diameter direction as a whole, two semi circle magnets may be supported by the support yoke 14 to be fixed to the rotor 10, thus providing a simple structure.

In addition, the first outside yoke 30 has two identical yoke semi circle portions 30a and 30b arranged in parallel on a circle and two gaps 32 are formed at positions of 180° in the circumferential direction by cutting off the opposing face in the circumferential direction of each yoke semi circle portion. Therefore, two hole elements or the like are disposed to produce signal outputs, each having the same phase or the reverse phase with each other when necessary The second outside yoke 40 is formed of two yoke semi circle portions 40a and 40b the flat shapes of which are the same as those of the yoke semi circle portion of the first outside yoke 30, and the gap 42 between the yoke semicircle portions is aligned with the gap 32 of the first outside yoke 30 to overlap the first outside yoke 30 and the second outside yoke 40. Accordingly the construction of the sensor is simple and has an advantage in downsizing.

In addition, since the upper and lower surfaces of the first outside yoke 30 and the second outside yoke 40 which are not opposed with each other in the axial direction are respectively flat surfaces and the height Hy of the stationary yoke 20 is constant over the circumferential direction, the mounting to the stationary side is easy and structurally simple.

Since the height h4 of the second outside yoke 40 along the circumferential direction has a complemetary relation with the height h3 of the first outside yoke 30 and the first outside yoke 30 and the second outside yoke 40 are overlapped with a constant clearance Lh, the flow of the magnetic flux from the ring-shaped permanent magnet 15 to the second outside yoke 40 becomes smooth, thus providing an advantage in obtaining linearity of signal outputs in particular.

Since the axial height of the ring-shaped permanent magnet 15 is smaller than the height of the stationary yoke 20 and the ring-shaped permanent magnet 15 is positioned in an axial direction closer to the side of the first outside yoke 30 than to the second outside yoke 40, a relatively large amount of the magnetic flux all the time passes the hole element 25 through the first outside yoke 30, and any influence of noises does not occur.

Since the ring-shaped permanent magnet 15 is mounted to the rotor through the support yoke 14 made of steel, irreversible heat demagnetization to the permanent magnet is controlled to be small even at high-temperature atmosphere, as well as the leaking magnetic flux in an inner diameter direction is controlled, thus providing smooth flow of the magnetic flux to the outside yoke 20.

Figure 6:
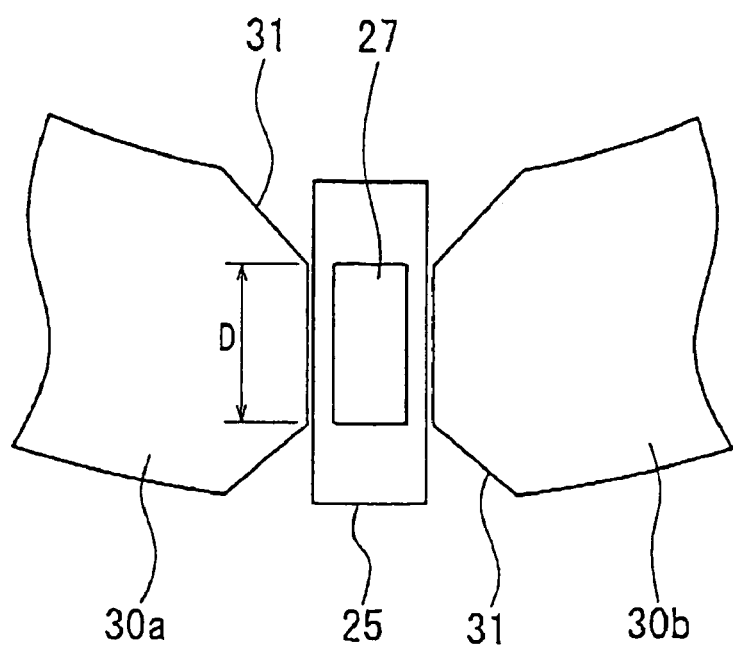
FIG. 6 is a view showing a conventional example.

Note that in the gap 32 in the preferred embodiment, the yoke semi circle portions 30a and 30b of the first outside yoke 30 are opposed at the entire end face with each other, but as shown in FIG. 6, when a cut portion 31 is disposed in each corner in an inner diameter side and an outer diameter side of the each yoke semi circle portion 30a and 30b to make the diameter width D of the opposing face be the same level of the width of the sensor chip 27 inside the hole element 25, substantial density of the magnetic flux to the hole element can be further increased. A cut portion in the same shape can be disposed in the gap 42 of the second outside yoke 40.

In the preferred embodiment, each cross section of the first outside yoke 30 and the second outside yoke 40 in the circumferential direction is formed in a rectangular shape, but when the height h3 of the opposing face to the ring-shaped permanent magnet 15 is appropriate, as long as a certain clearance Lh between the opposing faces in the upper and lower directions of the first outside yoke 30 and the second outside yoke 40 is secured, the influence due to the cross section is small and the cross section is not limited to the rectangular shape.

In the preferred embodiment, the hole element 25 is disposed in one of the two gaps 32 in the first outside yoke 30, but the hole element may be disposed in each gap. In this case, each hole element may output signals with the same phase each other or optionally with the reverse phase.

In addition, the hole element is disposed in the gap as a magnetic responsive element, but as a magnetic responsive element, other than the hole element, a hole IC of linear output type, a magnetic resistant element, or the like may be selected properly.

Further, general steel is used as each material of the support yoke 14, the first outside yoke 30, and the second outside yoke 40, but not limited thereto, silicon steel or magnetic steel may be used. It is preferable that the first outside yoke 30 and the second outside yoke 40 overlapped in the upper and lower directions are formed of the same material This application claims priority to Japanese Patent Application No. 2004-318131. The entire disclosure of Japanese Patent Application No. 2004-318131 is hereby incorporated herein by reference.

While only the selected preferred embodiment has been chosen to illustrate the present invention, it will be apparent to those skilled in the art from this disclosure that various changes and modifications can be made therein without departing from the scope of the invention as defined in the appended claims Furthermore, the foregoing description of the preferred embodiment according to the present invention is provided for illustration only, and not for the purpose of limiting the invention as defined by the appended claims and their equivalents.

What is claimed is:

1. A non-contact rotation angle detecting sensor, comprising:
    a ring-shaped permanent magnet which is rotated integrally with a rotor and a magnetic pole of which changes along a circumferential direction;
    a ring-shaped stationary yoke including a first yoke and a second yoke overlapped in an axial direction and surrounding an outer peripheral surface of the ring-shaped permanent magnet in a predetermined distance; and
    a magnetic responsive element disposed in a gap formed on a ring of the first yoke, wherein:
    an axial height of the first yoke changes along a circumferential direction.

2. The non-contact rotation angle detecting sensor according to claim 1, wherein:
    the ring-shaped permanent magnet includes two poles of N pole and S pole in a diameter direction as a whole and fixed to the rotor through a support yoke.

3. The non-contact rotation angle detecting sensor according to claim 1, wherein:
    the first yoke includes two yoke semi circle portions in the same shape, which are arranged in parallel on a circle; and
    the gap is formed by cutting off an opposing face in the circumferential direction of each of the yoke semi circle portions and is disposed as opposed at a position of 180° in the circumferential direction.

4. The non-contact rotation angle detecting sensor according to claim 3, wherein:
    the second outside yoke is formed of the two yoke semi circle portions the flat shapes of which are the same as the yoke semi circle portion of the first outside yoke; and
    the gap between the yoke semicircle portions is aligned with the gap of the first outside yoke to overlap the first outside yoke and the second outside yoke.

5. The non-contact rotation angle detecting sensor according to claim 1, wherein:
    the upper and lower surfaces of the first outside yoke and the second outside yoke which are not opposed with each other in the axial direction are respectively flat surfaces; and
    a height Hy of the stationary yoke is constant over the circumferential direction.

6. The non-contact rotation angle detecting sensor according to claim 5, wherein:
   in the circumferential position a height of the first outside yoke is large, a height of the second outside yoke is small;
   in the circumferential position the height of the first outside yoke is small, the height of the second outside yoke 40 is large; and
   the first outside yoke and the second outside yoke are overlapped with a constant clearance.

7. The non-contact rotation angle detecting sensor according to claim 1, wherein:
   an axial height of the ring-shaped permanent magnet is smaller than a height of the stationary yoke; and
   the ring-shaped permanent magnet is positioned in an axial direction closer to the side of the first outside yoke than to the second outside yoke.

* * * * *